United States Patent
Anderson, III

(10) Patent No.: US 11,196,240 B2
(45) Date of Patent: Dec. 7, 2021

(54) CABLE JUNCTION ENCLOSURE

(71) Applicant: AmpThink, LLC, Garland, TX (US)

(72) Inventor: William C. Anderson, III, Garland, TX (US)

(73) Assignee: AmpThink, LLC, Garland, TX (US)

( * ) Notice: Subject to any disclaimer, the term of this patent is extended or adjusted under 35 U.S.C. 154(b) by 26 days.

(21) Appl. No.: 16/778,849

(22) Filed: Jan. 31, 2020

(65) Prior Publication Data

US 2020/0303913 A1 Sep. 24, 2020

Related U.S. Application Data

(60) Provisional application No. 62/799,567, filed on Jan. 31, 2019.

(51) Int. Cl.
*H02G 3/16* (2006.01)
*H02G 3/08* (2006.01)
*H02G 3/18* (2006.01)

(52) U.S. Cl.
CPC .............. *H02G 3/16* (2013.01); *H02G 3/083* (2013.01); *H02G 3/18* (2013.01)

(58) Field of Classification Search
CPC ........................................................ H02G 3/16
USPC ........................................................... 174/59
See application file for complete search history.

(56) References Cited

U.S. PATENT DOCUMENTS

| | | | | |
|---|---|---|---|---|
| 5,033,978 A | * | 7/1991 | Thornhill | G02B 6/4454 439/540.1 |
| 7,816,602 B2 | * | 10/2010 | Landry | G02B 6/4452 174/50 |
| 2004/0007371 A1 | * | 1/2004 | Chang | H02G 3/083 174/50 |
| 2008/0247132 A1 | * | 10/2008 | Kosacek | H02G 3/30 361/679.4 |
| 2011/0249941 A1 | * | 10/2011 | Allwood | H02G 3/083 385/56 |
| 2012/0292096 A1 | * | 11/2012 | Wakileh | G02B 6/4448 174/480 |
| 2019/0372315 A1 | * | 12/2019 | Bailey | H02G 3/0456 |
| 2020/0303913 A1 | * | 9/2020 | Anderson, III | H02G 3/16 |

* cited by examiner

*Primary Examiner* — Stanley Tso
(74) *Attorney, Agent, or Firm* — AmpThink, LLC; James R. Banowsky

(57) ABSTRACT

A cable junction enclosure is described that provides new and improved ways of managing hybridized cable connections. The cable junction enclosures described herein include means for managing fiber cable and means for managing copper cable that originate in a single-sheathed hybridized cable. The cable junction enclosure described herein provides a more efficient way to manage multiple types of cable from a hybridized cable while providing increased security and protection for cables contained therein, entering thereto, and exiting therefrom.

9 Claims, 6 Drawing Sheets

External View

Internal View

Front View

Rear View

Right Side View

Left Side View

Top View

Bottom View

CABLE JUNCTION ENCLOSURE

BACKGROUND

In networks that support various types of electronic devices, cables are often required to connect discrete devices. For instance, in a Distributed Antenna System (DAS) network, cables may connect antennas and/or cellular components to a central connection point. This connection may be made using fiber optic cable or any type of cable that support network communications traffic. Typically, in today's applications, fiber optic cables are used to communicate data over a network. In addition to a cable to support communications, electronic devices may also need to be connected to a power source. This is typically accomplished using a cable comprised of an electricity-conducting material, such as copper. "Hybridized cable" combines fiber cable and copper cable within a single sheath, and such cables are becoming more popular for use in various applications, such as DAS networks, Passive Optical Networks (PON), long run applications, fiber-connected outdoor network assets (e.g. Internet of Things), etc.

SUMMARY

A cable junction enclosure is described that provides new and improved ways of managing hybridized cable connections. The cable junction enclosures described herein include means for managing fiber cable and copper cable that originate in a single-sheathed hybridized cable. The cable junction enclosure described herein provide a more efficient way to manage multiple types of cable from a hybridized cable while providing increased security and protection for cables contained therein, entering thereto, and exiting therefrom.

BRIEF DESCRIPTION OF THE DRAWINGS

A particular description of the principles briefly described above will be rendered by reference to specific embodiments thereof, which are illustrated in the appended drawings. Understanding that these drawings depict only certain exemplary embodiments of the disclosure and are not therefore to be considered to limit its scope, the principles herein are described and explained with additional specificity and detail through the use of the accompanying drawings.

DETAILED DESCRIPTION

Figure 1:
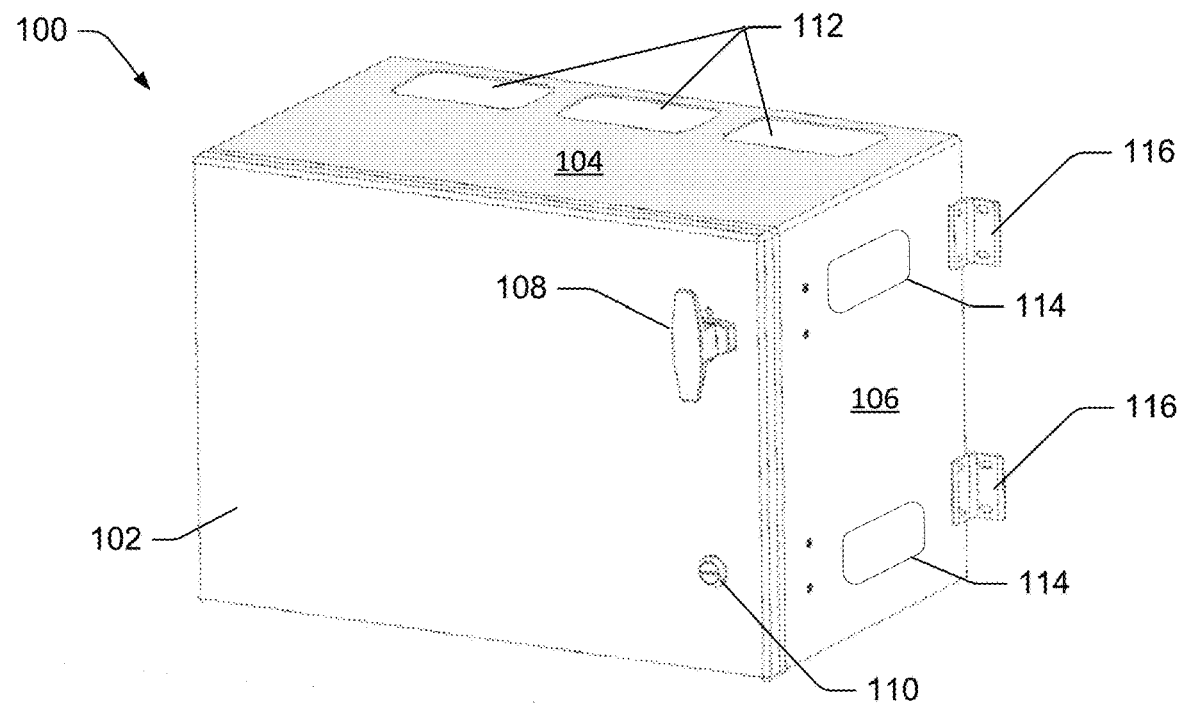
FIG. 1 depicts an external perspective view of an example cable junction enclosure in accordance with the embodiments described herein.

FIG. 1 depicts an external perspective view of an example cable junction enclosure 100 in accordance with the embodiments described herein. The example cable junction enclosure 100 includes a door 102, a top 104, and a right side 106. When the door 102 is in an open position, access can be made to the interior of the example cable junction enclosure 100. Although not explicitly shown in the drawings, in at least one alternative embodiment, a second door may be located in or comprise a different side of the example cable junction enclosure 100. In such a case, access may be made from more than one side of the enclosure. In one such embodiment, the interior features of the enclosure—discussed in detail, below—are replicated so that one set of features faces one door, while another set of features faces the other door, thus doubling the capacity of cable inputs and outputs that may be made to the example cable junction enclosure 100.

A handle 108 is disposed on the door 102 and can be used to open and close the door 102. A lock is disposed in the door 102 and can be used to secure contents of the example cable junction enclosure 100. One or more top ports 112 are disposed in the top 104 of the example cable junction enclosure 100, the top ports 112 allowing one or more cables to pass into the example cable junction enclosure 100. As shown in FIG. 1, knockouts 114 are disposed in the right side 106 of the example cable junction enclosure 100, the knockouts 114 being easily removed to provide additional ports for cable access if needed. Knockouts may be located at any practicable location on the example cable junction enclosure 100. As shown, mounting brackets 116 are attached to the example cable junction enclosure 100 and provide a way for the example cable junction enclosure 100 to be mounted to a stable surface.

Figure 2:
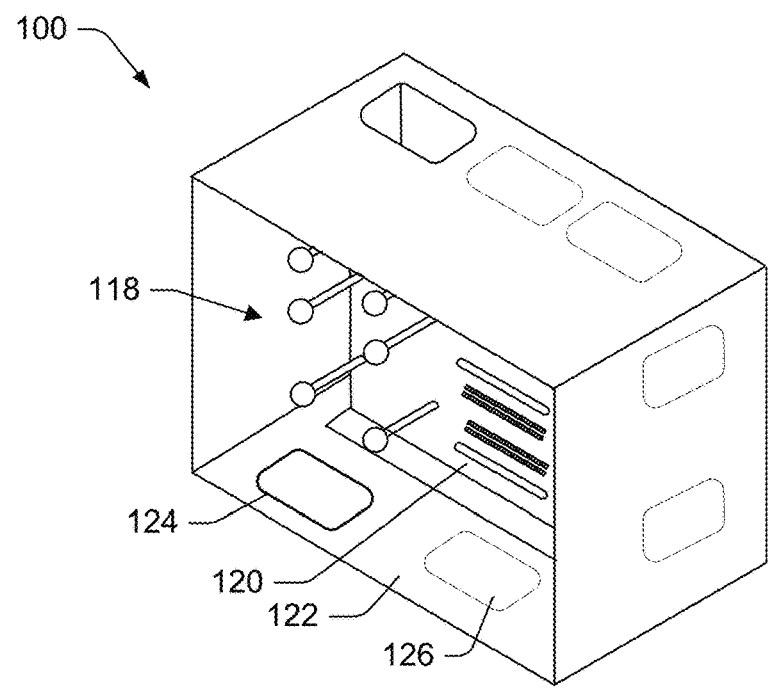
FIG. 2 depicts an internal perspective view of an example cable junction enclosure in accordance with the embodiments described herein.

FIG. 2 depicts an internal perspective view of the example cable junction enclosure 100 shown in FIG. 1. The example cable junction enclosure 100 includes a first cable spool 118 and a second cable spool 120. The first cable spool 118 and the second cable spool 120 can be used to store excess cable, with each spool being able to store a different type of cable, as will be discussed below. The example cable junction enclosure 100 also includes a bottom 122, which is shown having a bottom port 124 extending therethrough, and a knockout 126 which may be used to accommodate future expansion cables that extend from inside the example cable junction enclosure 100 to outside the example cable junction enclosure 100. Although not shown in the drawings, the example cable junction enclosure 100 may also include sealing elements to protect interior features from wind, rain, harsh environments (e.g. factories, outdoors), submersion, etc.

Figure 3A:
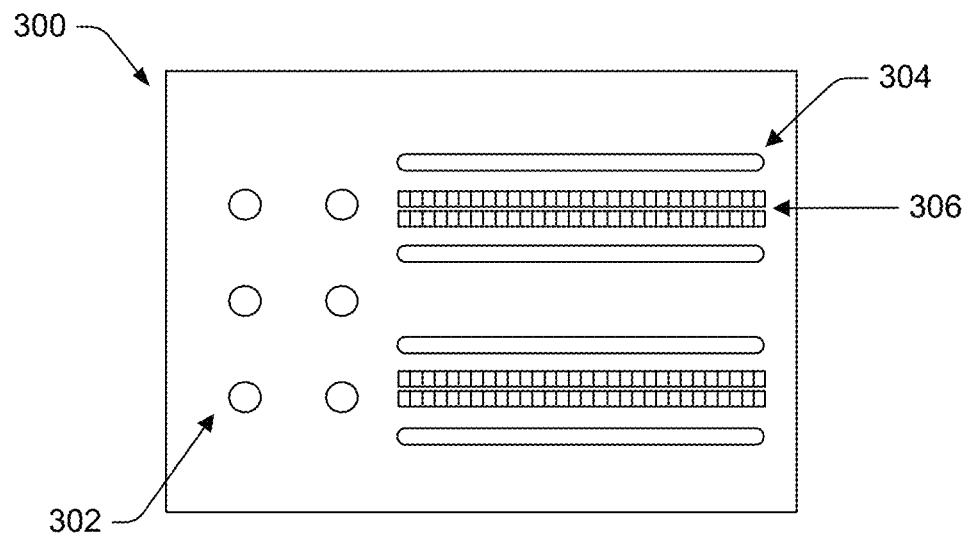
FIG. 3*a* is an illustration of internal features of an example cable junction enclosure.

FIG. 3*a* is an illustration of internal features of an example cable junction enclosure 300. The example cable junction enclosure 300 includes a first cable spool 302 and one or more second cable spools 304. The first cable spool 302 and the second cable spools 304 are disposed in different ways inside the example cable junction enclosure 300, and are configured to accept different types of cables, if desired. For example, the first cable spool 302 may be configured to receive fiber optic cable, which has certain bend radius requirements that are met by the first cable spool 302, and the second cable spools may be configured to receive copper power cable. The example cable junction enclosure 300 also includes a series of connectors 306 that may be used to connect incoming cable with outgoing cable. The connectors 306 may be included in a terminal block or a similar structure. Such a structure may include finger boards and/or other features that assist with cable management. Although the connectors 306 shown in the present example are passive connectors, it is noted that the connectors 306 could be replaced with active electronics that provide voltage conversion or other distribution technologies (e.g. digital electricity). Furthermore, a DIN rail (i.e., a rail of a standard type widely used for mounting circuit breakers and industrial control equipment inside equipment racks) (not shown) may be utilized to allow for extension of the example cable junction enclosure 100 in future applications.

Figure 3B:
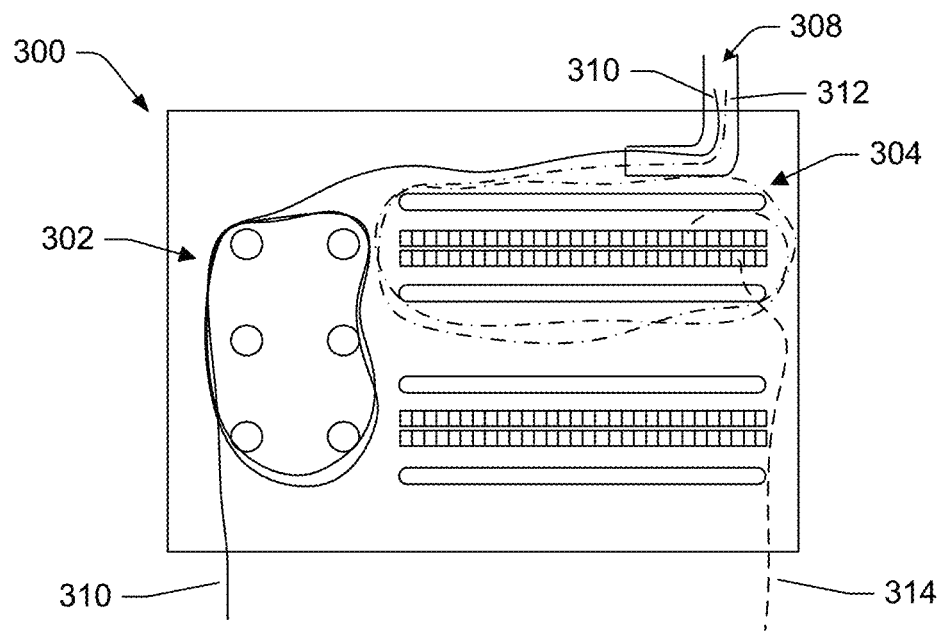
FIG. 3*b* is an illustration of the example cable junction enclosure shown in FIG. 3*a*, also depicting cables disposed therein.

FIG. 3b is an illustration of the example cable junction enclosure 300 shown in FIG. 3a, also depicting cables disposed therein. A hybridized cable 308 is shown entering into the example cable junction enclosure 300. The hybridized cable 308 includes a fiber optic cable 310 and an incoming power cable 312. When the hybridized cable 308 is unsheathed, the fiber optic cable 310 and the incoming power cable 312 are exposed. It is noted that although the present example illustrates a single strand that represents the fiber optic cable 310 and a single strand that represents the incoming power cable 312, the fiber optic cable 310 and/or the incoming power cable 312 may comprise any practicable number of cables. For example, in a DAS network environment, it would not be unusual for the hybridized cable 308 to include a bundle of twelve (12) fiber optic cables and a bundle of six (6) copper power cables. It is also noted that the hybridized cable 308 is typically encased in a heavy-duty sheath that offers a greater degree of protection than sheaths typically encasing a fiber optic cable, a copper cable, etc. For this reason, once a hybridized cable sheath is removed, protection for the cables contained within the hybridized cable is diminished to a significant degree. One feature of the example cable junction enclosure 300 is that it provides greater protection for cables contained within the hybridized cable sheath once the sheath is removed therefrom.

The fiber optic cable 310 may be disposed around the first cable spool 302, and the incoming power cable 312 may be disposed around one of the second cable spools 304. The incoming power cable 312 terminates in one of the connectors 306. An outgoing power cable 314 is shown extending from one of the connectors 306 and out of the example cable junction enclosure 300. Although not explicitly shown, the outgoing power cable 314 may be spooled around one of the second cable spools 304 before exiting the example cable junction enclosure 300. It is noted that there is not necessarily a one-to-one correspondence of a number of incoming power cables to outgoing power cables. For example, an incoming power cable could be a feeder cable that carries one thousand Watts (1000 W), and connections may be made to endpoints that only consume three hundred Watts (300 W) each. Therefore, an enclosure may have one incoming power cable that connects to more than one (three in this example) outgoing cable via the connectors 306. The provision of features that allow cables to be spooled and effectively stored, prevents cables from being severed to shorter, exact lengths to fit a particular installation. By allowing longer cables to be stored within the enclosure, future changes to components serviced via the example cable junction enclosure 100 or future relocation of the example cable junction enclosure 100 can be accommodated without the need to install additional cabling.

Figure 4:
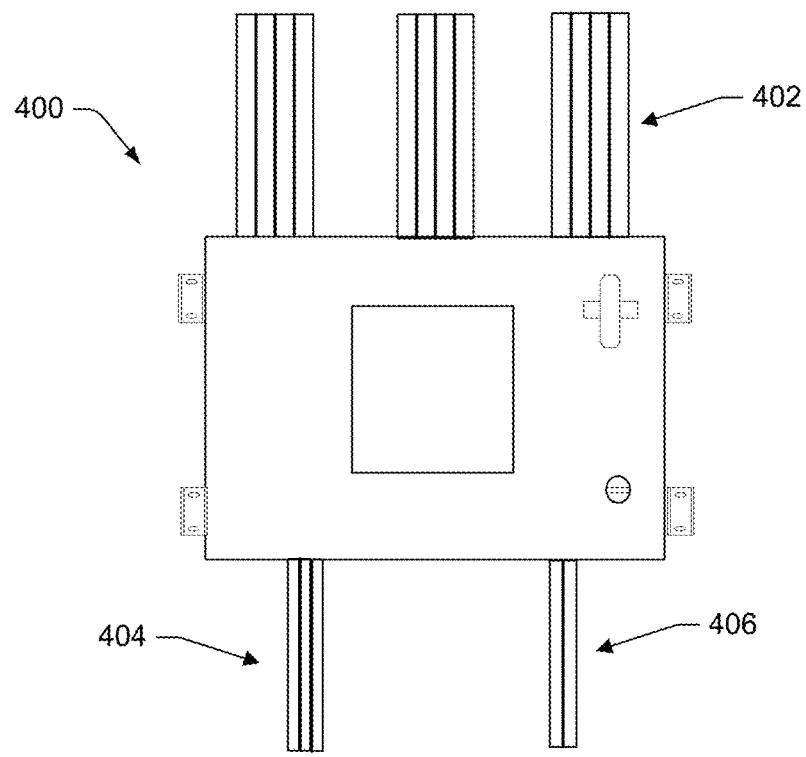
FIG. 4 depicts a front view of an example cable junction enclosure in accordance with the description herein.

FIG. 4 depicts a front view of an example cable junction enclosure 400 in accordance with the description herein. Multiple hybridized cables 402 are shown entering into the example cable junction enclosure 400. One or more fiber optic cables 404 exit from the example cable junction enclosure 400 and extend away therefrom. Similarly, one or more outgoing power cables 406 exit from the example cable junction enclosure 400 and extend therefrom.

Figure 5:
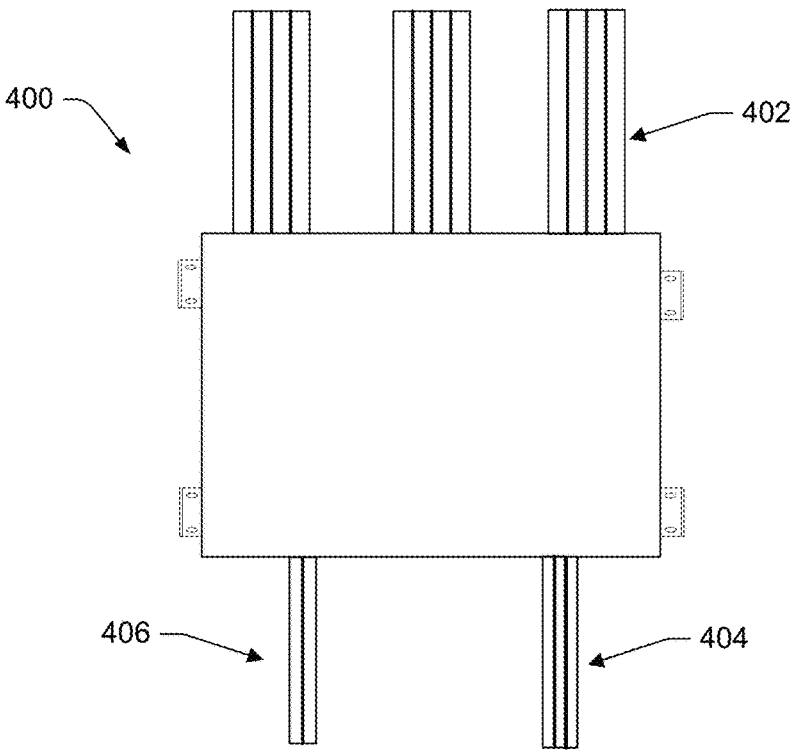
FIG. 5 depicts a rear view of the example cable junction enclosure shown in FIG. 4.

FIG. 5 depicts a rear view of the example cable junction enclosure 400 shown in FIG. 4. Multiple hybridized cables 402 are shown entering into the example cable junction enclosure 400. One or more fiber optic cables 404 exit from the example cable junction enclosure 400 and extend away therefrom. Similarly, one or more outgoing power cables 406 exit from the example cable junction enclosure 400 and extend therefrom.

Figure 6:
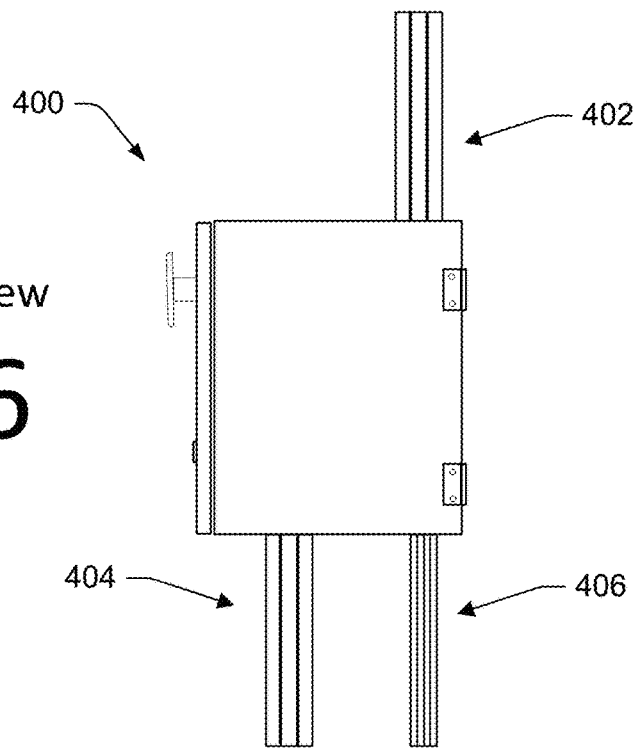
FIG. 6 depicts a right side view of the example cable junction enclosure shown in FIG. 4.

FIG. 6 depicts a right side view of the example cable junction enclosure 400 shown in FIG. 4. Multiple hybridized cables 402 are shown entering into the example cable junction enclosure 400. One or more fiber optic cables 404 exit from the example cable junction enclosure 400 and extend away therefrom. Similarly, one or more outgoing power cables 406 exit from the example cable junction enclosure 400 and extend therefrom.

Figure 7:
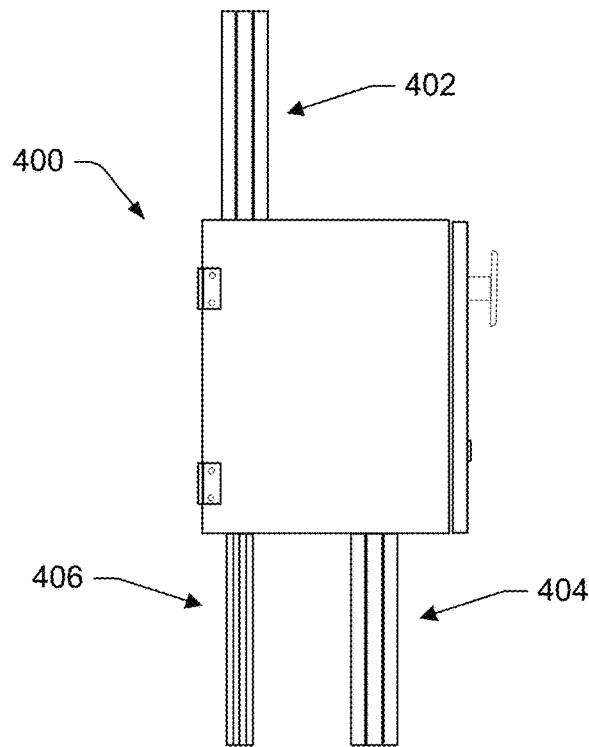
FIG. 7 depicts a left side view of the example cable junction enclosure shown in FIG. 4.

FIG. 7 depicts a left side view of the example cable junction enclosure 400 shown in FIG. 4. Multiple hybridized cables 402 are shown entering into the example cable junction enclosure 400. One or more fiber optic cables 404 exit from the example cable junction enclosure 400 and extend away therefrom. Similarly, one or more outgoing power cables 406 exit from the example cable junction enclosure 400 and extend therefrom.

Figure 8:
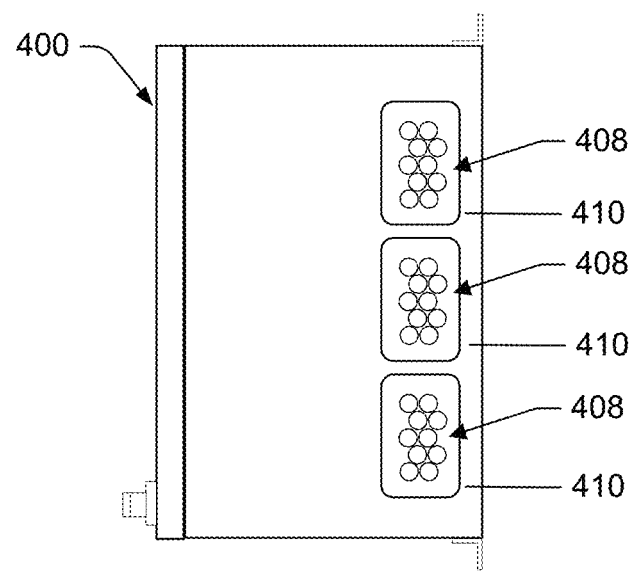
FIG. 8 depicts a top view of the example cable junction enclosure shown in FIG. 4.

FIG. 8 depicts a top view of the example cable junction enclosure 400 shown in FIG. 4. Multiple hybridized cables 408 enter into the example cable junction enclosure 400 through one or more top ports 410.

Figure 9:
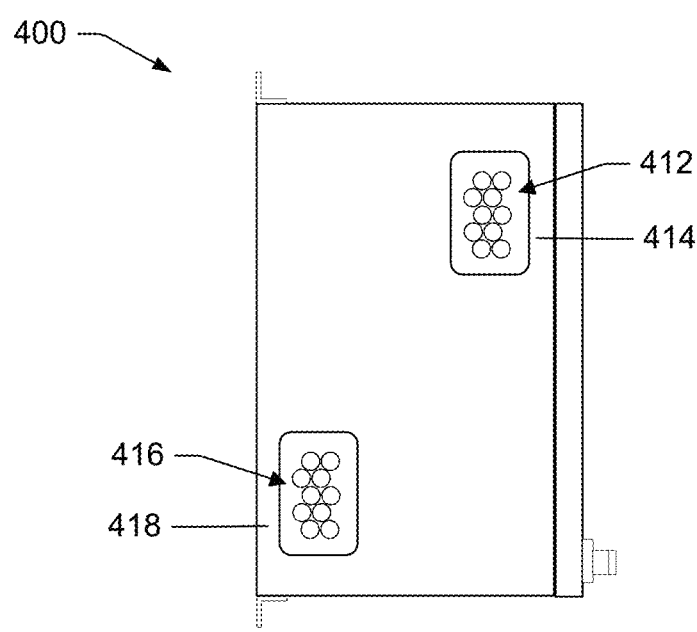
FIG. 9 depicts a bottom view of the example cable junction enclosure shown in FIG. 4.

FIG. 9 depicts a bottom view of the example cable junction enclosure 400 shown in FIG. 4. One or more fiber optic cables 414 exit from the example cable junction enclosure 400 through a first bottom port 414. One or more outgoing power cables 416 exit from the example cable junction enclosure 400 through a second bottom port 418.

Figure 10:
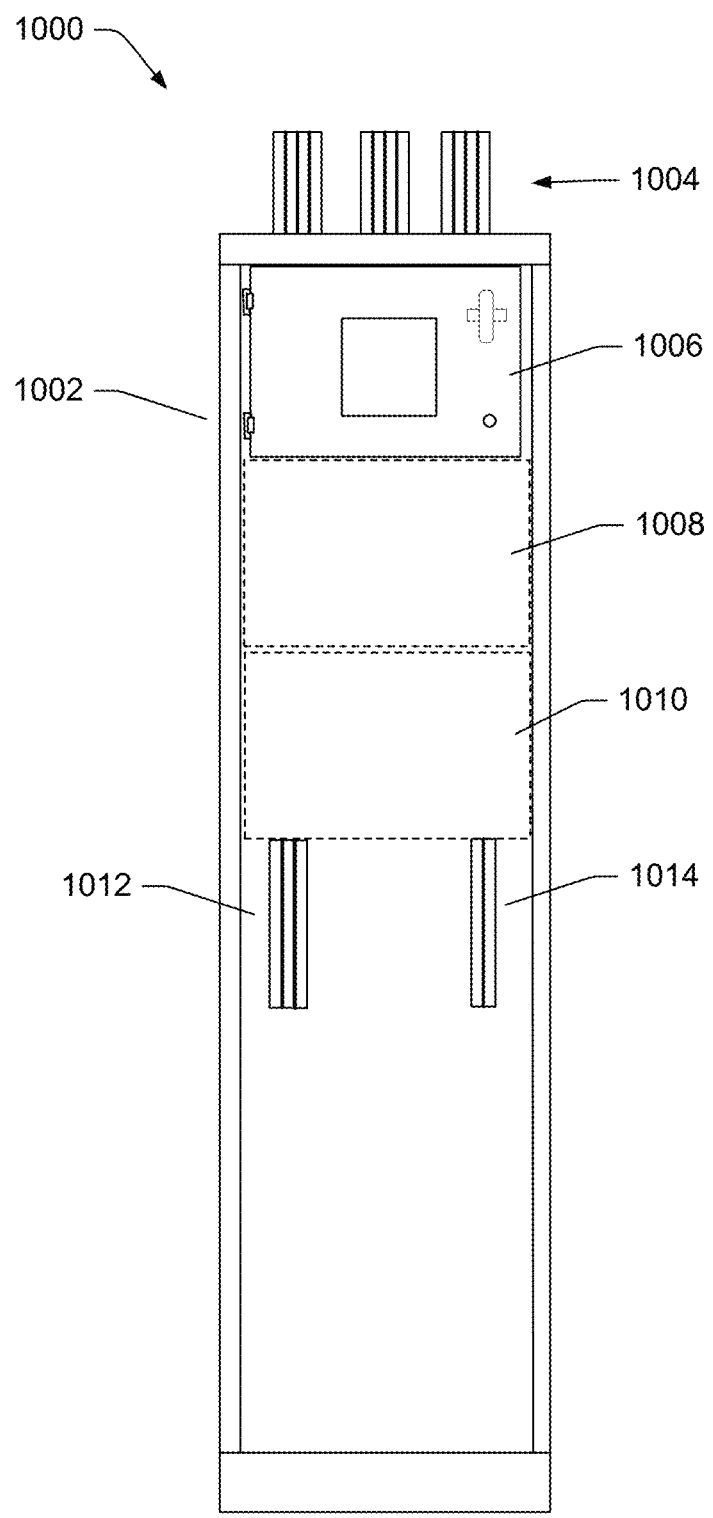
FIG. 10 depicts a network service rack that contains an example cable junction enclosure in accordance with the description herein.

FIG. 10 depicts an example network service rack 1000 that includes a rack 1002 that secures a cable junction enclosure 1004 in accordance with the description herein. One or more hybridized cables 1006 are shown entering into the example network service rack 1000 and, more specifically, into the cable junction enclosure 1004. The example network service rack 1000 is also shown including a first rack component 1008 and a second rack component 1010 secured thereto. The first rack component 1008 and/or the second rack component 1010 may be any typical rack component used in a Wi-Fi network, such as remote power supplies, network switches, fiber optic termination enclosures (LIU), other cable junction enclosures, etc. One or more fiber cables 1012 and one or more outgoing power cables 1014 are shown exiting the rack components 1008, 1010 (after exiting the cable junction enclosure 1004), although other configurations may differ.

CONCLUSION

While the invention is described with respect to certain embodiments and/or generally associated methods, alterations and permutations of these embodiments and application to any application, such as a large-scale Wi-Fi network deployment, a person having ordinary skill in the art will recognize other applications in which the presently described cable junction enclosure may be used. Accordingly, the above description of example embodiments does not define or constrain this disclosure. Other changes, substitutions, and alterations are also possible without departing from the spirit and scope of this disclosure, as defined by the following claims.

The invention claimed is:

1. A cable junction enclosure, comprising:
a first opening receiving a hybridized cable that includes a first fiber optic cable and a power cable;
a second opening receiving the fiber optic cable;
a third opening receiving a second power cable;
a first cable spool receiving the fiber optic cable; and
a second cable spool receiving the power cable;
a connector panel terminating the power cable and the second power cable;
wherein the connector panel is positioned within an interior of the second cable spool; and
wherein the power cable is spooled around an exterior of the connector panel.

2. The cable junction enclosure as recited in claim 1, wherein the fiber optic cable further comprises multiple fiber optic cables.

3. The cable junction enclosure as recited in claim 1, wherein the connector panel is located proximal to one of the cable spools so that a cable can be spooled on the cable spool prior to being terminated in the connector panel.

4. The cable junction enclosure as recited in claim 1, wherein the first opening is located in a first side of the cable junction enclosure and the second opening is located in a second side of the cable junction enclosure.

5. The cable junction enclosure as recited in claim 4, wherein the third opening is located in the second side of the cable junction enclosure.

6. The cable junction enclosure as recited in claim 4, wherein the third opening is located in a third side of the cable junction enclosure.

7. A network service rack, comprising:
a cable junction enclosure that includes a first cable spool and a second cable spool;
a network component;
means to receive an input cable that is made up of a fiber optic cable and a power cable so that the input cable is passed through a first opening into the cable junction enclosure, wherein at least a portion of the fiber optic cable is spooled around the first cable spool and at least a portion of the power cable is spooled around the second cable spool; and
means to pass the fiber optic cable from the cable junction enclosure to the network component by way of at least a second opening after the fiber optic cable has been spooled around the first cable spool;
a connector panel terminating the power cable after the power cable has been spooled around the second cable spool;
means to pass a second power cable from a second network component to the connector panel terminating the second power cable on the connector panel; and
wherein the connector panel is positioned within an interior of the second cable spool;
wherein the power cable is spooled around an exterior of the connector panel.

8. The network service rack as recited in claim 7, wherein means to pass the second power cable from the second network component to the connector panel further comprises means to pass the the second power cable through a third opening in the cable junction enclosure.

9. The network service rack as recited in claim 7, wherein the first power cable and the second power cable further comprise copper power cables.

* * * * *